Figure 1:
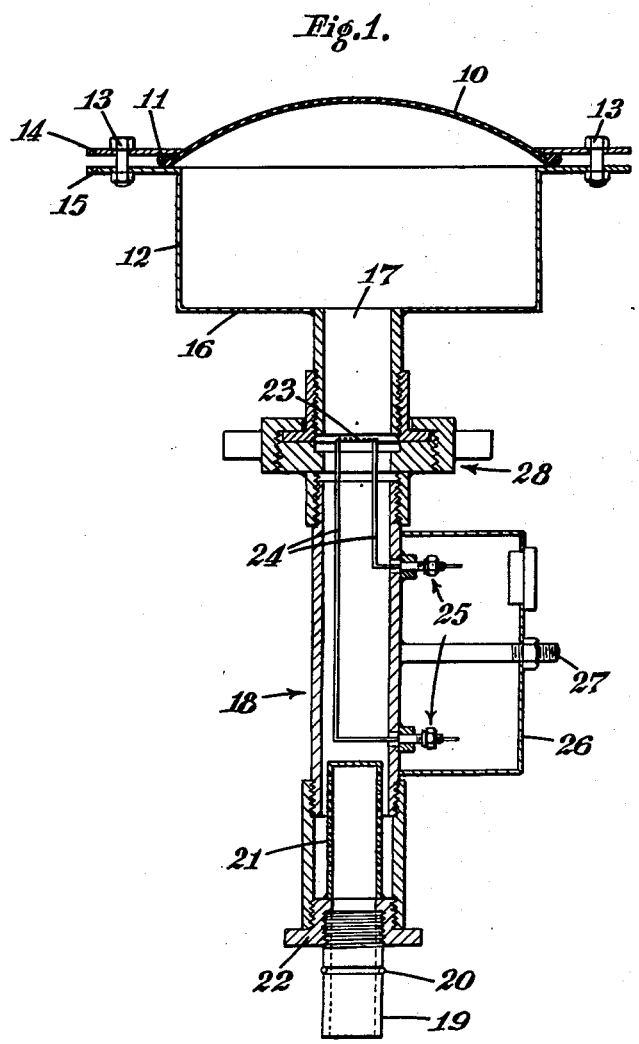

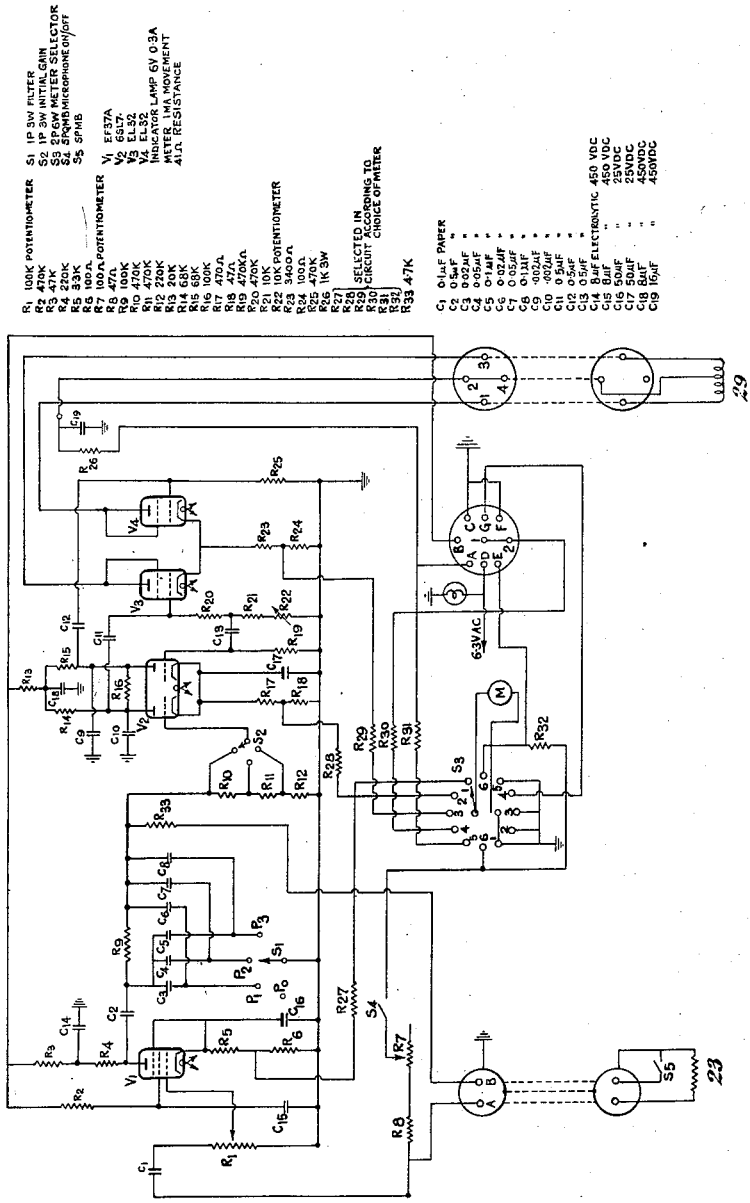

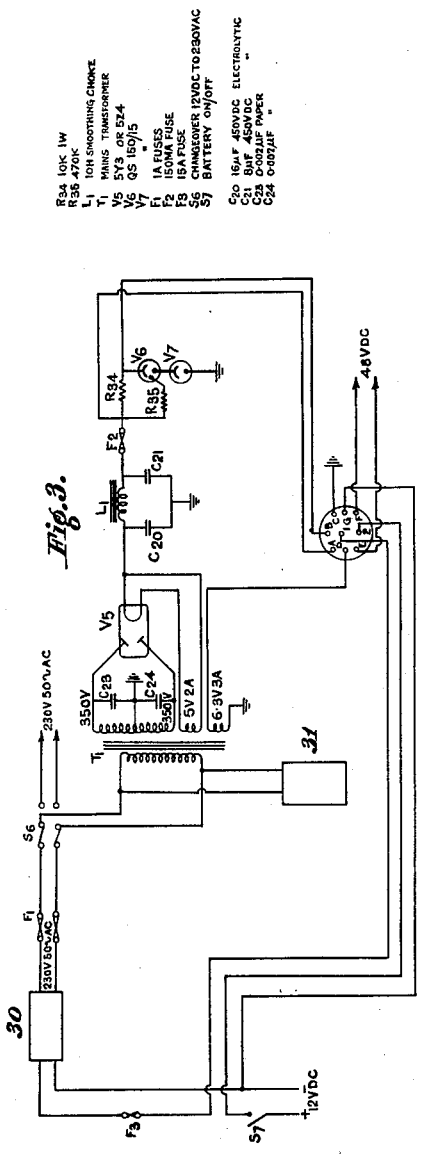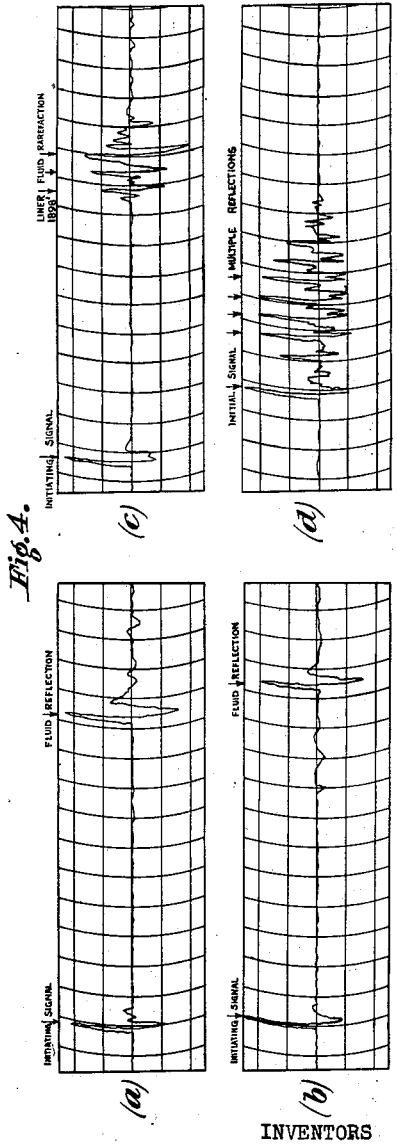

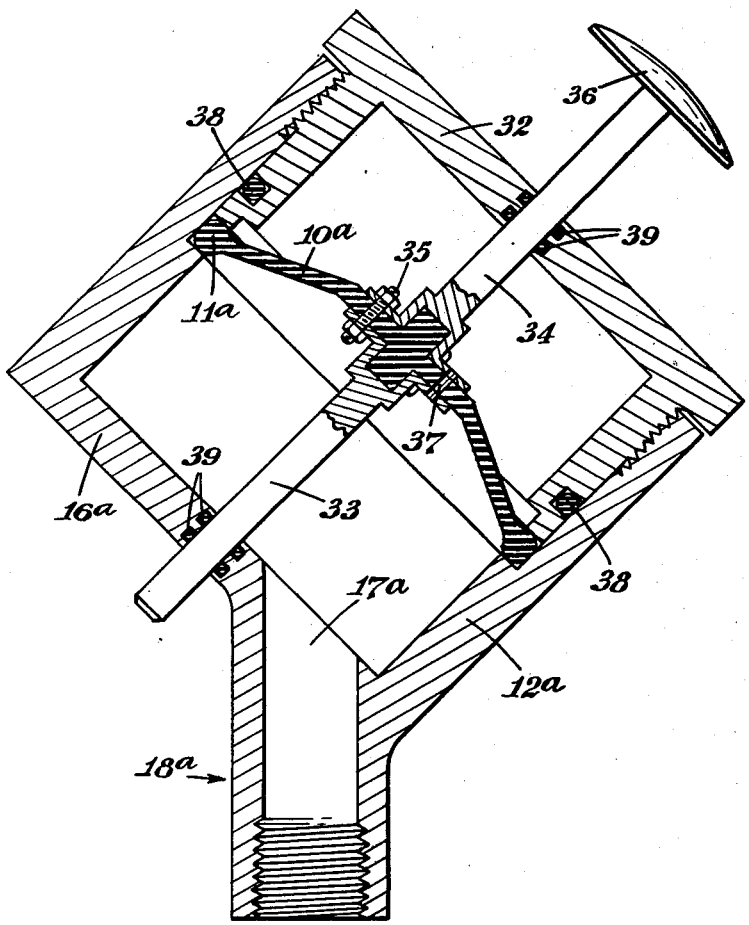

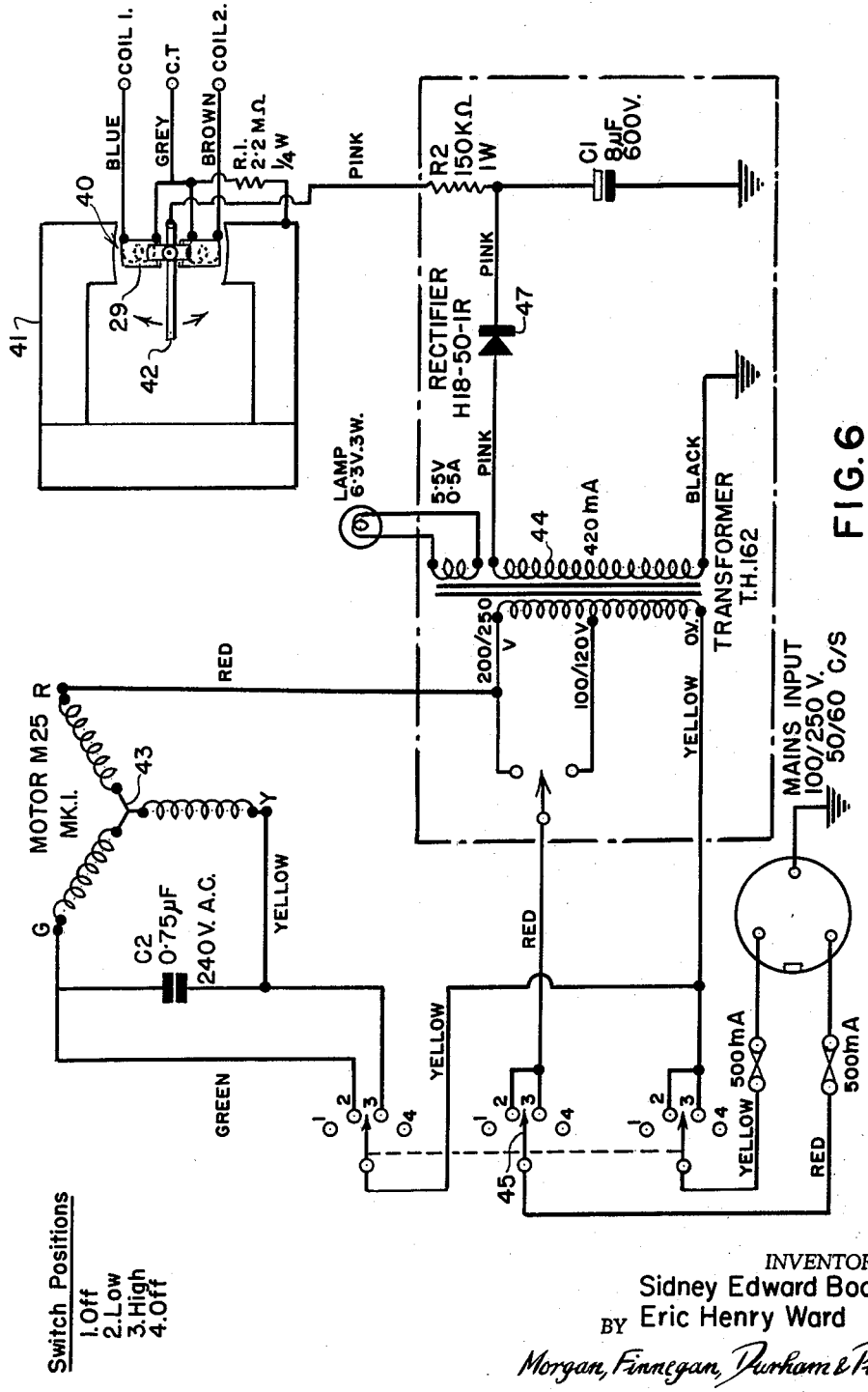

United States Patent Office 2,927,301
Patented Mar. 1, 1960

2,927,301

MEASUREMENT OF LIQUID LEVELS IN WELLS

Sydney Edward Booth and Eric Henry Ward, Nottingham, England, asisgnors to The British Petroleum Company Limited Application June 8, 1954, Serial No. 435,322

Claims priority, application Great Britain July 2, 1953

8 Claims. (Cl. 340—18)

This invention relates to echometering.

The principal object of the invention is to provide an improved method of, and apparatus for measuring and recording liquid levels in wells, e.g. oil wells.

In many oil wells it is desirable to carry out tests frequently to determine the depth of the oil level as by so doing it is possible to tell whether or not all the available oil is being obtained and the production rate can be controlled accordingly.

It is known to measure liquid levels in wells by sending an impulse (pressure or sound wave) down the well and measuring the time lag between the initiating impulse and the echo from the liquid surface. The impulse may be produced by firing a cartridge but this is not satisfactory owing to the fact that the mechanism for firing the cartridge quickly becomes fouled and subsequently will not operate. A more satisfactory method of producing the impulse is to pass a high pressure air jet through a small orifice but the need for a regular supply of compressed air is cumbersome and presents a limitation to the versatility of the unit particularly in packer tests where it is necessary to record the amount of air used when determining production rates.

The usual method of detecting the echo is by means of a microphone, usually either a moving coil microphone or a hot wire microphone. The electric signals produced by the microphone are amplified and made to operate recording means. The amplifying circuits used in existing instruments are not entirely satisfactory particularly when the instrument has to be used for a number of wells having considerably different liquid levels.

We have now developed a self-contained, easily transportable echometer which does not suffer from the above drawbacks.

According to the invention, a method of measuring and recording the level of liquid in a well comprises sending down the well a low frequency sound wave produced by vibrating a resilient diaphragm made, for example, of rubber or other resilient material secured across a resonant chamber which communicates with the well, detecting the reflected wave by means of a microphone sensitive to such a low frequency wave, amplifying the resulting electrical signals and recording the amplified signals.

The invention also includes apparatus for measuring and recording the level of liquid in a well, comprising a resilient diaphragm made, for example, of rubber or other resilient material and secured across a resonant chamber which is adapted to communicate with the well in such manner that when the diaphragm is made to vibrate a low frequency sound wave is sent down the well, and a sound detector comprising a microphone sensitive to such a low frequency wave connected to amplifying and recording means.

The construction of the diaphragm should be such that the sound wave set up when it is made to vibrate contains a large proportion of low frequencies, e.g. less than about 50 c./s. (cycles per second), since higher frequencies are greatly attenuated in wells, particularly those containing obstacles such as tubing and insulators.

Correspondingly, the microphone should be one which is sensitive to low frequencies. A moving coil microphone, though very sensitive generally, has increased sensitivity in the higher frequency ranges which causes the discrimination between reflections from tubing joints, etc., above the liquid level, and the main reflection from the liquid to become much less pronounced. Furthermore a moving coil microphone requires frequencies of 50 c./s. and above whereas for best results the sound wave should have a lower fundamental frequency than this. A hot wire microphone is therefore preferred since this is sensitive to low frequencies.

The diaphragm may advantageously be secured at its periphery across a cylindrical chamber which communicates through an aperture in its base with a tube for communicating with the well, the tube being of much smaller diameter than the cylindrical chamber and the hot wire microphone being situated at the upper end of the tube near the junction with the cylindrical chamber. Having the microphone near the end of the tube near where it communicates with the relatively large diameter chamber gives improved detection of the echo and it is believed that this may be due to the fact that the microphone is in effect at the open end of a wind pipe and therefore at an antinode where maximum air disturbance is created.

Advantageously the amplifier may contain one or more filter means capable of being switched in or out of the circuit as required whereby the frequency response of the amplifier may be varied and unwanted signals attenuated. Advantageously also, the amplifier may be provided with a switch for varying the gain. By this means feeble echoes from deep wells may be amplified more than strong echoes from shallow wells and a suitable amplified signal may in all cases be passed to the recording means.

Any conventional recording means may be used e.g. one having a standard, ink-type, pivoted, stylus pen operated by the amplified signal and recording the signal on paper which is driven at constant speed e.g. by a synchronous motor. A better trace, however, can be obtained using a special impregnated electrolytic paper through which a D.C. current is passed from the pen, the trace being burned on the paper. Such recording apparatus is well known and can be obtained commercially. The time between the initial impulse and the echo can be obtained from the distance on the record between the two "kicks" and the known paper speed.

The invention will now be described by way of example with reference to the accompanying drawings in which:

Figure 1 is a sectional elevation of a sound producer and detector for use on low pressure wells, Figure 2 is a circuit diagram of the amplifier, Figure 3 is a circuit diagram of the power pack, Figure 4 (a, b, c and d) shows typical echometer traces obtained in the use of the apparatus of Figures 1–3, Figure 5 is a sectional elevation of a sound producer for use on high pressure wells, and Figure 6 is a circuit diagram of the recording means.

Referring first to Figure 1, the sound producing mechanism comprises a circular, domed, rubber diaphragm 10 having a peripheral beading 11. The diaphragm 10 is secured over the open end of a cylindrical chamber 12 by means of bolts 13 which compress beading 11 between ring 14 and flange 15. The chamber 12 is approximately 8 inches in diameter by 3" deep. The base 16 of chamber 12 is provided with a central aperture 17 communicating with a cylindrical tube designated generally by 18 and consisting, as shown, of a number of smaller tubes screwed to one another. The lower end of tube 18 is provided with a quick connector 19 which plugs into a socket in the well head. An O-ring 20 makes a reasonably pressure-tight joint. The internal diameter of the tube 18 is about 1½ inches. A damping filter 21 is provided and consists of a cylindrical tube closed at its upper end and welded at its lower end to bush 22, the cylindrical wall portion of the tube being provided with holes to allow the passage of sound. A hot wire microphone 23 is connected by leads 24 to terminals 25 which are protected by terminal box 26 held in position by bolt 27. The microphone is made up of 50 S.W.G. resistance wire and is energised from a 48 volt D.C. source to give a current of 200 milliamps. in the wire. Connecting wires (not shown in Figure 1) lead from the terminals 25 to the amplifier. Access to the microphone 23 may quickly be gained by unscrewing a quick release wing union 28.

The diaphragm 10 may be made to vibrate by tapping it, e.g. with the finger or by striking it, e.g. with the palm of the hand. This vibration will cause a low frequency sound wave to be set up and pass through the cylindrical chamber 12 and the cylindrical tube 18 by which latter the sound wave may be sent down the well.

Referring now to Figure 2, the input signal from the hot wire microphone 23 is fed to the grid of valve $V_1$ where it is amplified 100 times. It then passes through a filter network $C_3C_4C_5$, $R_9$, $C_6C_7C_8$ and the gain control switch $S_2$ to the grid of valve $V_2$. The filter network can be switched in or out of the circuit as required by means of switch $S_1$ and so enables the frequency response of the amplifier to be controlled and unwanted signals (e.g. reflections from tubing joints to above the liquid level) to be attenuated. Valve $V_2$ is a double triode, the first half of which amplifies and feeds to valve $V_3$, returning a portion to the second half of valve $V_2$ for amplification to $V_4$. $V_3$ and $V_4$ form a push-pull arrangement with the centre-tapped coil 29 of the recording means acting as the anode loads of the two valves $V_3$ and $V_4$. About 40% negative feedback is applied from the third to the first stage of amplification in order to stabilise the amplifier against H.T. and L.T. fluctuations.

At a frequency of 25 c./s., the amplifier without filters requires an input of 16.5 mv. to produce full-scale deflection on the recorder. The amplifier alone has a linear frequency response between 10 and 10,000 c./s. and switching in the filters gives the results tabulated below.

Table

| Filter Position | 25 c./s. input for full scale on recorder, mv. | Amplifier cut-off frequency, c./s. |
| --- | --- | --- |
| $P_0$ | 16.5 | 15,000 |
| $P_1$ | 22 | 500 |
| $P_2$ | 38 | 200 |
| $P_3$ | 86 | 80 |

As the intensity of the initiating signal is sufficient to overload the amplifier, a push-button switch $S_5$ is provided so that the operator can attenuate the initial signal and then return the amplifier to full gain in time to receive the return echo.

For ease in servicing the amplifier a rotary switch $S_3$ and meter M have been incorporated on the amplifier panel. At any time the current taken by the hot wire, the current flowing through each valve, the H.T. potential or the L.T. battery potential can be measured.

Referring to Figure 3, the power for the unit is derived from a 12 volt, 72 ampere-hour car battery which feeds a D.C./A.C. converter 39 to produce 230 volts, 50 cycles A.C. at 75 watts maximum rating. A portion of this power is used to run the motor of the recorder 31 and provide the 500 volts necessary for the recorder pen. The remainder is available to run the amplifier. Using a conventional full wave rectifying valve $V_5$ and choke/capacity filter, a 300 volt D.C. stabilised H.T. supply is provided.

The total watts consumed from the 12 volt battery is 64, while a further 10 watts are required from an H.T. dry battery to energise the hot wire microphone.

A standard Henry Hughes Single Pen Teledeltos Recorder MKV is used with the H.M.T., centre-tapped coil assembly (29) which gives an impedance of 5000 ohms per winding. The recorder responds to frequencies in the range of 0–80 c./s. peaking around 50 c./s., the natural frequency of the suspension.

Referring to the circuit diagram of this recorder shown in Fig. 6, the center-tapped coil assembly 29 corresponds to the center-tapped coil 29 shown in Fig. 2. The coil 29 is of the so-called moving coil type and, in its mechanical arrangement, is mounted in the gap 40 of the horseshoe magnet 41. A pivoted stylus 42 is attached to the moving coil 29 and the operation of the whole apparatus is such that the signal from microphone 23, Fig. 1, is amplified and fed to coil 29. This causes coil 29 to vibrate and the stylus 42 to move with the coil. The stylus may be a standard, ink-type, pivoted stylus pen operated by the amplified signal and recording the signal as an ink trace on a paper chart such as is depicted in Fig. 4. The chart is driven at substantially constant speed by a synchronous chart drive motor 43 powered by an A.C. transformer 44. The motor speed, and hence the paper speed, may be controlled by the gang switch 45.

The stylus 42, as depicted in Fig. 6 is designed to be used with a special electrolytic paper through which a direct current is passed from the stylus, the trace being burned on the paper as the paper is moved by the chart drive motor 43. To this end, the stylus is electrically connected to a rectifier 47 in circuit with the secondary of A.C. transformer 44, so as to be provided with direct current of suitable magnitude for creating the desired electrolytic trace on the moving electrolytic paper chart.

The speed of the chart is maintained constant to within ±1% by means of the 50 c./s. A.C. synchronous chart drive motor 43 and a check on the speed may be made at any time by the use of an auxiliary pen which can be driven from a half second, clockwork maintained, impulse timer.

Typical traces using this recorder are shown in Figure 4. Traces $a$ and $b$ were obtained from an oil well having 60 feet of 6 inch casing and the remainder 4 inch casing. Trace $c$ was obtained from an oil well having a 6 inch casing and a 4½ inch liner at 1898 feet. Trace $d$ was obtained from a water well. In the case of $b$ the diaphragm was lightly tapped; in all other cases it was sharply struck with the palm of the hand. In all cases the amplifier filter was in the $P_3$ position.

It will be seen that the arrangement shown in Figure 1 can only be used on wells producing low gas pressures, or no pressure at all, at the surface. For wells producing a high gas pressure at the surface the arrangement shown in Figure 5 is suitable. A cylindrical chamber 12a is provided with a hole 17a for communicating with the well via tube 18a. The chamber 12a is closeable by a cap 32 which can be screwed into the chamber 12a so as to grip the peripheral beading 11a of a circular rubber diaphragm 10a. In order that the diaphragm 10a may be vibrated to produce a sound wave it is secured at its centre to rods 33 and 34 which are bolted together by three bolts 35 and which pass through the base 16a, of the chamber 12a, and cap 32 respectively. The rod 34 is provided with a striking knob 36 which when struck, e.g. by the hand, causes the diaphragm 10a to vibrate. A hole 37 is provided to balance the pressure on the two sides of the diaphragm. O-ring seals 38 and 39 make the arrangement pressure tight. The two sets of O-rings 39 provide a pressure balance arrangement for the striking knob, and the striking force has therefore only to overcome the frictional forces in these glands.

The expression "resonant chamber," when used in the specification and claims, means a relatively wide chamber with a relatively narrow neck for communicating with the well. Such a chamber acts as a sound box and weak signals reflected from the liquid in the well are amplified when they emerge from the narrow neck into the chamber.

We claim:

1. Apparatus for measuring and recording the level of liquid in a well, comprising a resonant chamber comprised of a relatively wide chamber having a relatively narrow neck for communicating with the well; a resilient diaphragm secured across said relatively wide chamber, said chamber and diaphragm being of a construction to provide a tuned vibratory system such that when said diaphragm is made to vibrate by being tapped or struck, a sound wave having a fundamental frequency of less than about 50 cycles per second and containing a large portion of frequencies less than about 50 cycles per second, is set up for sending down said well through said relatively narrow neck; a sound detector contained in said resonant chamber for intercepting the reflected sound wave and converting sonic energy thereof into electrical signals, said detector having its greatest sensitivity in the range of sound frequencies less than about 50 cycles per second; an amplifier for said electrical signals, said amplifier being capable of attenuating any undesired high frequencies from said electrical signals and delivering the desired low frequency depth-measuring signal in sufficient strength to operate a means for recording the amplified electrical signals; and, means for recording the amplified electrical signals.

2. Apparatus in accordance with claim 1 in which said sound detector comprises a hot wire microphone situated in said relatively narrow neck.

3. Apparatus in accordance with claim 2 in which said relatively wide chamber is cylindrical, said relatively narrow neck is a cylindrical tube, and said sound detector is a hot wire microphone situated in said tube near the junction thereof with said relatively wide cylindrical chamber.

4. Apparatus in accordance with claim 3 in which a damping filter is situated in said tube.

5. Apparatus according to claim 1, in which the amplifier is provided with one or more filter means capable of being switched in or out of the circuit as required whereby the frequency response of the amplifier may be varied and unwanted signals attenuated.

6. Apparatus according to claim 1, in which the amplifier is provided with a switch for varying its gain.

7. Apparatus according to claim 1, in which the recording means comprises a standard, ink-type, pivoted stylus pen operated by the amplified signal, and a chart to be driven at constant speed, on which the signal is recorded.

8. Apparatus according to claim 1, in which the recording means comprises an impregnated electrolytic paper chart capable of being driven at constant speed, and a pivoted pen operated by the amplified signal for passing a D.C. current from the pen through the paper whereby said current may burn a trace in the paper.

References Cited in the file of this patent

UNITED STATES PATENTS

| 1,468,305 | Kunze | Sept. 18, 1923 |
| 2,232,476 | Ritzman | Feb. 18, 1941 |
| 2,281,301 | Walker | Apr. 28, 1942 |
| 2,324,340 | Walker | July 13, 1943 |
| 2,403,535 | Kremer | July 9, 1946 |
| 2,522,433 | Dahlbery | Sept. 12, 1950 |
| 2,600,967 | Chernosky | June 17, 1952 |

FOREIGN PATENTS

| 644,288 | Great Britain | Nov. 22, 1945 |